United States Patent Office 3,294,637
Patented Dec. 27, 1966

3,294,637
METHOD OF EXTRACTING HYPOCHOLESTERO-
LEMIC FLAVONIC DERIVATIVES FROM *LESPE-
DEZA CAPITATA* LEAVES
Claude Marie Henri Cervelle, 165 Blvd. Haussmann,
Paris, France
No Drawing. Filed Apr. 16, 1962, Ser. No. 187,970
Claims priority, application France, July 12, 1958,
770,205; June 20, 1959, 798,093
1 Claim. (Cl. 167—65)

The present invention relates to new flavonic derivatives, which have high hypocholesterolemic properties. The invention relates also to a method of extraction of said flavonic derivatives. This application is a continuation-in-part of my application Serial No. 825,653, filed July 8, 1959, now abandoned.

It is well known that flavonic derivatives are the yellow pigments of certain plants derived from chromone, and that they are insoluble in petroleum ether and partially soluble in water, which distinguishes them from carotenoids and lipochromes. Their basic formula is as follows:

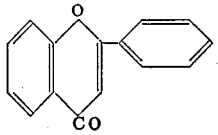

The new flavonic derivatives according to my invention are extracted from the *Lespedeza capitata*. The genus Lespedeza has been principally used in harvesting and as starting substances for obtention of certain known flavonic derivatives which are chemically well defined and the formula of which has been established. Reference is to be made here to *Lespedeza crytobotrya* from which Hasegawa has extracted (Chemical Abstracts, 35, 1941, 1403) an easily hydrolysable substance, which he calls lespedin and contains essentially a birhamnoside of kaempferol. I further refer to *Lespedeza sericea* conventionally employed to growth the life stock. I am further aware that the known flavonic derivatives, particularly lespedin, have been proposed and used as diuretics and that such derivatives, especially when prepared from Soybean oil meal, offer an estrogenic activity; however, such estrogenic activity is detrimental to hypocholesterolemic action.

In course of my work on *Lespedeza capitata*, I tried to prepare flavonic derivatives from a series of Lespedeza other than *Lespedeza cyrtobotrya*, according to the method just above referred to for lespedin, but no results have been obtained when starting from other—particularly *capitata*—Lespedeza than *Lespedeza cyrtobotrya*. I have then utilised the following process of extraction:

1 kg. of complete and fresh leaves of *Lespedeza capitata* were extracted for about 1 hour with 10 liters of 96% ethyl alcohol at boiling of the alcohol. The alcoholic extract (about 9.5 liters) was filtered, the residue was ground and extracted a second time with the same alcohol for one hour. The filtrate was concentrated by boiling under a reduced pressure (with a water-jet pump) 20 mm. Hg and the extract (150 ml.) collected. The combined extract (150 ml.) were treated by 300 ml. boiling distilled water to precipitate the chlorophyll and there has been left at rest for 12 hours. It then was filtered on ordinary filter paper, the chlorophyll being retained on the paper. The filtrate (dark yellow colored liquid of 450 ml.) was concentrated by heating at boiling temperature (about 90° C.) at reduced pressure of 20 mm. Hg to give 200 ml. of concentrate.

The resulting concentrate was treated to remove any oily material by extraction of the concentrate first with 150 ml. of diethyl ether at room temperature and a second time with 150 ml. of diethyl ether also at room temperature. This second quantity of ethyl ether was maintained for 48 hours in contact with the concentrate, after which the ether was separated by decanting the extractive liquor, of which remained about 190 ml.

Said extractive liquor was exhausted successively by utilization of ethyl acetate and butanol.

(1) *Exhaustion by ethel acetate*

The 190 ml. of extractive liquor were treated in a decanting ampoule with 100 ml. of ethyl acetate which was separated after 2 hours. The extractive liquor was then treated in the same way three times successively by further 100 ml. of ethyl acetate for 2 hours each time, i.e. finally there were 4 exhausting operations each time with 100 ml. of ethyl acetate. The four ethero-acetic liquors were combined, and concentrated on a water-bath under reduced pressure 20 mm. Hg until a persisting turbidity was attained. It was left for 24 hours in a refrigerator and the raw precipitate of flavonic derivative was then collected by centrifugation (quantity comprised between traces and 1.2% of the weight of the fresh plant treated).

(2) *Exhaustion by butanol*

By operating as above described for ethylacetate, but with butanol as exhaustion liquid, there was obtained the complement to 1.2% of fresh plant in the form of raw precipitate of flavonic derivative.

As a total, the obtained quantity of flavonic derivative was 1.2% of the fresh plant, corresponding approximately to 2.8% of the dry plant.

The crude (or raw) precipitate obtained is a powder of chamois colour and its characteristics are reproducible. It gives the general reactions of flavonic derivatives, especially in respect of its degree of solubility in various solvents, its color reactions and its chromatographic tests; it is, however, to be noted that the said precipitation is less soluble in cold water. The efficiency of the operation is equal to 2.8% of the weight of dry plant. Since the water content of the fresh plants has been found to be equal to 57%, the efficiency relative to the weight of fresh plants is equal to 1.2%.

Particular emphasis must be laid on the function of the butanol, which is a fundamental feature of my said process.

In addition, I have found that the extraction can be improved and that the purity of the flavonic derivatives obtained can be increased. To this end, the operations of exhaustion of the previously ground plants are carried out by means of ether and chloroform, in order to carry off selectively various troublesome impurities such as oils and tannins, the presence of which hinders and slows down the completion of the various stages of the treatment.

This operation was as follows:

1 kg. of dried and ground leaves of *Lespedeza capitata* was exhausted twice in a continuous extracting apparatus such as a well known Soxhlet or Kumagawa, each time for 4 hours with 2 liters of boiling petroleum ether (B.P. from 40 to 60° C.). The dried residue was successively treated with boiling chloroform (three exhausting operations each 4 hours with 2 liters chloroform) and then with ether (two exhausting operations each 4 hours with 2 liters ether), so that troublesome greasy impurities such as oils and tannins were eliminated.

The dried residue was exhausted four times with ethyl acetate at boiling temperature, each time 6 hours with 4 liters of ethyl acetate, said treatment dissolving the flavonic derivatives of the plant.

The extractive liquors (about 15 liters) resulting from said exhaustions were combined and concentrated to 600 ml. by boiling under reduced pressure of 20 mm. Hg. A raw precipitate was obtained, was left to rest for 48 hours and then separated by centrifugation. The mother liquors (600 ml.) were re-concentrated at ½, i.e., 300 ml. and a second precipitate, was obtained similarly. The combined quantity of raw precipitate was about 2.8% of the dry plant.

To increase the degree of purity of the flavonic derivatives thus obtained in the raw state, the ethero-acetic liquors containing the raw precipitates above referred to (i.e., the liquors exhausted by ethyl acetate and by butanol) were placed in a refrigerator of usual type for 48 hours, after which the precipitates were separated by centrifugation and dried under vacuum 20 mm. Hg. A quantity of silica equal to that of the separated dried and combined precipitates was added to that combined precipitate and placed in the cup of a Kumagawa apparatus. This mixture was treated successively 2 hours with chloroform at a rate of 10 ml. chloroform for each gram of precipitate and 2 hours with sulphuric ether (100 ml. per g. of precipitate), so that the remaining impurities were removed. It was then exhausted three times with ethyl acetate (each time 3 hours and 100 ml. of ethyl acetate) the flavone passed into the ethyl acetate. The three fractions $$(3 \times 100 = 300 \text{ ml.})$$

were combined and concentrated on a water-bath under reduced pressure of 20 mm. Hg. As soon as a turbidity appeared, the concentration was stopped and the liquid stored 24 hours in a refrigerator. The precipitate was separated by centrifugation. The precipitate was then re-dissolved in the minimal quantity of boiling alcohol (at will from a concentration of 30 to 45°). The precipitate was left for 24 hours at room temperature and then cooled in a refrigerator for further 24 hours; after cooling the pure new derivative was crystallised as fine pale yellow needle-like crystals.

The quantity of pure product obtained was about $\frac{1}{1000}$ of the fresh plant, i.e., about $\frac{2.5}{1000}$ of the dried plant.

Said pure product has a melting point of 293–295° C. measured by the method of the Maquenne block.

The products extracted, either raw or purified precipitate, have the following characteristics:

(a) Solubility:

They are insoluble in ether, petroleum ether, chloroform, less soluble in ethyl acetate, acetone and water, and relatively soluble in hot methyl, and ethyl alcohols;

(b) Coloured reactions of the crude and purified precipitates:

| | |
|---|---|
| HCl+Zn | Lilac colour. |
| HCl+Mg | Orange colour. |
| NaOH | Pure yellow. |
| FeCl$_3$ (alcohol) | Greenish brown. |
| FeCl$_3$ (aqueous) | Green colour. |
| Citro-boric reagent | Greenish yellow colour and pronounced fluorescence with ultra-violet light. |
| Magnesium acetate | Yellow colour, highly fluorescent. |
| AlCl$_3$ | Greenish yellow colour. |
| AlCl$_3$+HCl+Zn | O. |
| Lead sub-acetate solution | Yellow precipitate. |
| Ammonium molybdate | Yellow colour. |

(c) Chromatography:

The chromatographic employed is a conventional method for analysis and identification of substances. It is the type giving separation on paper following the rising method, that is, the paper is in contact with the solution at its lower extremity the solution thus moves upwards solely by capillarity.

The measurement of the stain is effected by measuring the distance traveled by the substance causing the stain, with reference to the distance traveled by the solvent:

$$Rf = \frac{\text{distance travelled by the substance}}{\text{distance travelled by the solvent}}$$

In the case of the crude precipitate, the solvent is acetic acid at a concentration of 60%. The period of exposure is 15 hours at a temperature of 20° C. The development is effected by means of alcoholic potash. After drying, the readings are taken by ultra-violet light.

By ultra-violet light there are observed two separate main stains with two paler stains on each side, namely, from the bottom to the top:

A stain with a light yellow-orange colour — $Rf = 0.50$
A stain with a strong yellow-orange colour — $Rf = 0.66$
A stain with an intense canary yellow colour — $Rf = 0.75$
A blue fluorescent stain — $Rf = 0.82$ In the case of the purified precipitate, the method is applied with three different solvents under the same conditions as given above, namely:

Period of exposure, hours — 15
Temperature, ° C. — $20 \pm 1$
Development by alcoholic potash; reading by ultra-violet light, after drying.

There can then be observed:

(a) With the mixture of butanol, acetic acid and water (4–1–5), a single bright yellow stain: $Rf = 0.50$;

(b) With the mixture comprising iso-amylic alcohol, petroleum ether, acetic acid and water (3–1–3–3) a single bright yellow stain: $Rf = 0.38$;

(c) With saturated aqueous ethyl acetate, a single bright yellow stain: $Rf = 0.30$.

These three chromatograms each show a single stain characterised by a constant $Rf$ value, and define the product showing that this crystallised flavonic derivative is a pure product.

From the above, it results that the product is a true flavone (owing to the orange colouration occurring with Mg in hydrochloric medium), is a heteroside (owing to the ultraviolet spectrum, the values of $Rf$) and I am entitled to qualify the new product as a flavonic heteroside, which is difficult to hydrolyze and which will be called hereafter as *lespecapitoside*. I note that no kaempferol has been encountered in the extract.

The chemical formula of said *lespecapitoside* or *lespedoside* of the invention has not yet been determined, however the above characteristics and the fact that, when starting from leaves of *Lespedeza capitata*, the above process surely provides the same raw or purified precipitate, respectively, clearly identifies the product.

My invention further concerns drug compositions having the hypocholesterolemic properties and containing as active element a quantity of said new *lespecapitoside* generally used in an amount of about 0.5 to 1 cg. per day for an adult. To my best knowledge, the hypocholesterolemic properties of said new *lespecapitoside* were not previously known, either for the product or for the starting plant. Said properties are detailed hereafter. My experiments have shown that the purified product is more active and the raw product has a far less activity. As concerns the hypocholesterolemic activity I may assume that the raw precipitate (called "totum") contains even growth factors which are common to many leguminous plants, especially certain Lespedeza (among which the *Lespedeza sericea* is employed in the United States for growth of livestock). I note that said factors are detrimental to the hypercholesterolemic patients; this growth factor acts against the favourable action of the pure product.

My new product has been examined on the points of view of innocuousness and tolerance, and of hypocholesterolemic properties. Tests have been realized on rabbits, under any control and with bath a tincture of *Lespedeza*

*capitata* and a solution of the above prepared *lespecapitoside*:

(I) *Tolerance of the tincture of* Lespedeza capitata

When measured in the case of rabbits by intravenous injection in large doses, namely 1 cc. of sealed solution per kg. of animal, this dose was injected each day into the marginal vein. The animals showed no apparent sign of trouble due to these massive doses injected over a period of 6 days. The autopsy of the animals killed confirmed the absence of any attack of hepatic renal and pulmonary parenchymae.

This dose of 1 cc. per kilogram is considerably greater than the doses used for human beings, introduced solely by the mouth, and which do not exceed 800 drops per day or approximately 16 cc. in the case of an adult person weighing 75 kilograms.

(II) *Tolerance of a solution of* Lespecapitoside.—(1) *Intravenous injectability*

*Technique.*—I administer in the marginal vein of the rabbit's ear, 4 cg. of *lespecapitoside* diluted in 20 cc. of sterile apyrogenic physiological serum. The injection is carried out slowly. The period of observation lasts 8 days.

*Results.*—The animal shows no symptom of shock or intolerance, either during the first 24 hours or in the course of the 8 days which follow.

(2) *Tolerance of tissues*

*Technique.*—Two dilutions of solution were employed: 1 cg. in 5 cc. of isotonic serum, and 1 cg. in 10 cc. of isotonic serum.

These preparations were injected in small volumes, 0.05 cc., into the derm:
 (a) Of the internal skin of the rabbit's ear;
 (b) Of the skin on the back of the guinea pig from which the fur has been removed.

*Results.*—In the case of both solutions, the resorption was perfect, both at the level of the rabbit's ear and also on the back of the guinea pig.

(3) *Pyrogenic tests*

*Technique.*—3 rabbits were injected through the marginal vein of the ear with a dose of 1 cg. of *lespecapitoside* diluted in 10 cc. of sterile apyrogenic physiological serum. 1 check-sample rabbit was given an injection of 10 cc. of the apyrogenic physiological serum which was used to dilute the *lespecapitoside*. The pyrogenic tests were negative according to the French Codex.

*Clinical work.*—Large number of tests have been realized on rabbits to verify the hypocholesterolemic action of the *lespecapitoside* according to the present invention. The conclusions of these series of tests are that the action of the new product results in a valuable decrease of cholesterol.

Clinical tests have been developed to verify the action of the *lespecapitoside* on the human beings. Said tests have confirmed the results furnished by animal experimentation and established that hypocholesterolemic action are attained without injury to the human beings. The new product also offers an action against deposit of lipidic bodies on the walls of human inner channels.

What I claim is:

A method of extraction of flavonic derivatives contained in the leaves of *lespedeza capitata,* said method comprising the steps of: reducing dried leaves of said plant to powder, exhausting said powder with ether and chloroform to carry off selectively various undesired impurities including oils and tannins, treating the exhausted powder with ethyl alcohol, distilling under reduced pressure, precipitating chlorophyll by treating the distillate with boiling water, filtering, concentrating the filtrate under reduced pressure, degreasing said filtrate with sulphuric ether, exhausting the liquor thus obtained by successive treatment with ethyl acetate and butanol, collecting together the fractions obtained by said successive treatments, distilling said flavonic derivatives to produce a crude precipitate of the flavonic derivatives, and purifying the crude precipitate by prolonged contact in the cold state of the crude precipitate and said exhaustion liquor, before separation from said exhaustion liquor, centrifuging the mixture to form a precipitate, drying the centrifuged precipitate under vacuum, exhausting said precipitate in a plurality of stages over a period of about 4 hours with boiling ethyl acetate, concentrating the exhaustion liquors until about half the solvent is driven off, cooling to crystallize the flavonic derivatives and recrystallizing said flavonic derivatives in ethyl alcohol having a concentration of about 45°.

References Cited by the Examiner

FOREIGN PATENTS 1,201,726   7/1959   France.

OTHER REFERENCES

Chem. Abs., vol. 54, 1960; p. 3860i.
Gazette Medicale de France, 64(24), Dec. 25, 1957, suppl. pp. 1 to 7.
Paris Academie Des. Sci. Compt. Rend., T254, Jan. 8, 1962, pages 352–353.

JULIAN S. LEVITT, *Primary Examiner.*

FRANK CACCIAPAGLIA, JR., *Examiner.*

ANNA P. FAGELSON, VERA C. CLARKE,
    *Assistant Examiners.*